June 13, 1939.   S. KHATUNZEFF   2,161,963
APPARATUS FOR SHAPING TUBES, SHELLS, OR THE LIKE
Filed July 23, 1938   2 Sheets-Sheet 2
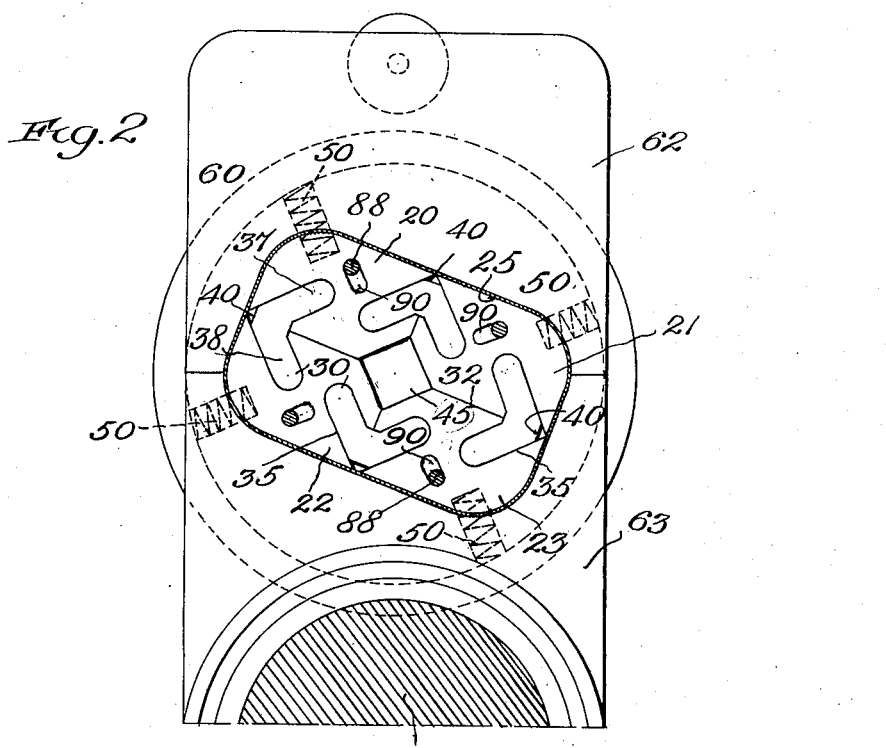
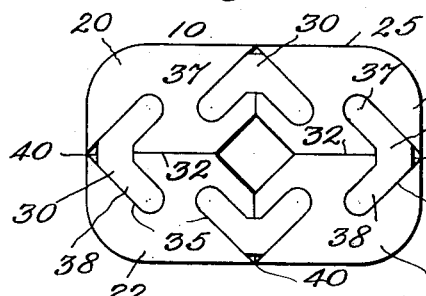
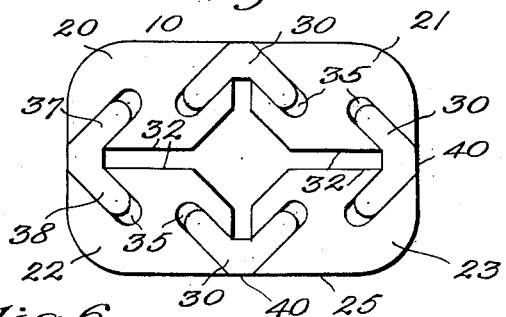
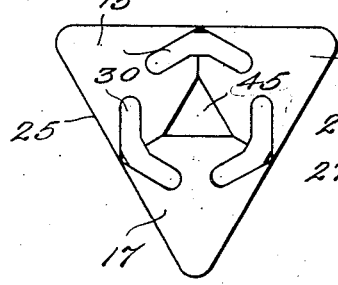
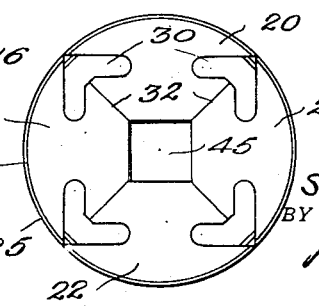
INVENTOR
SERGE KHATUNZEFF
BY
ATTORNEY Patented June 13, 1939

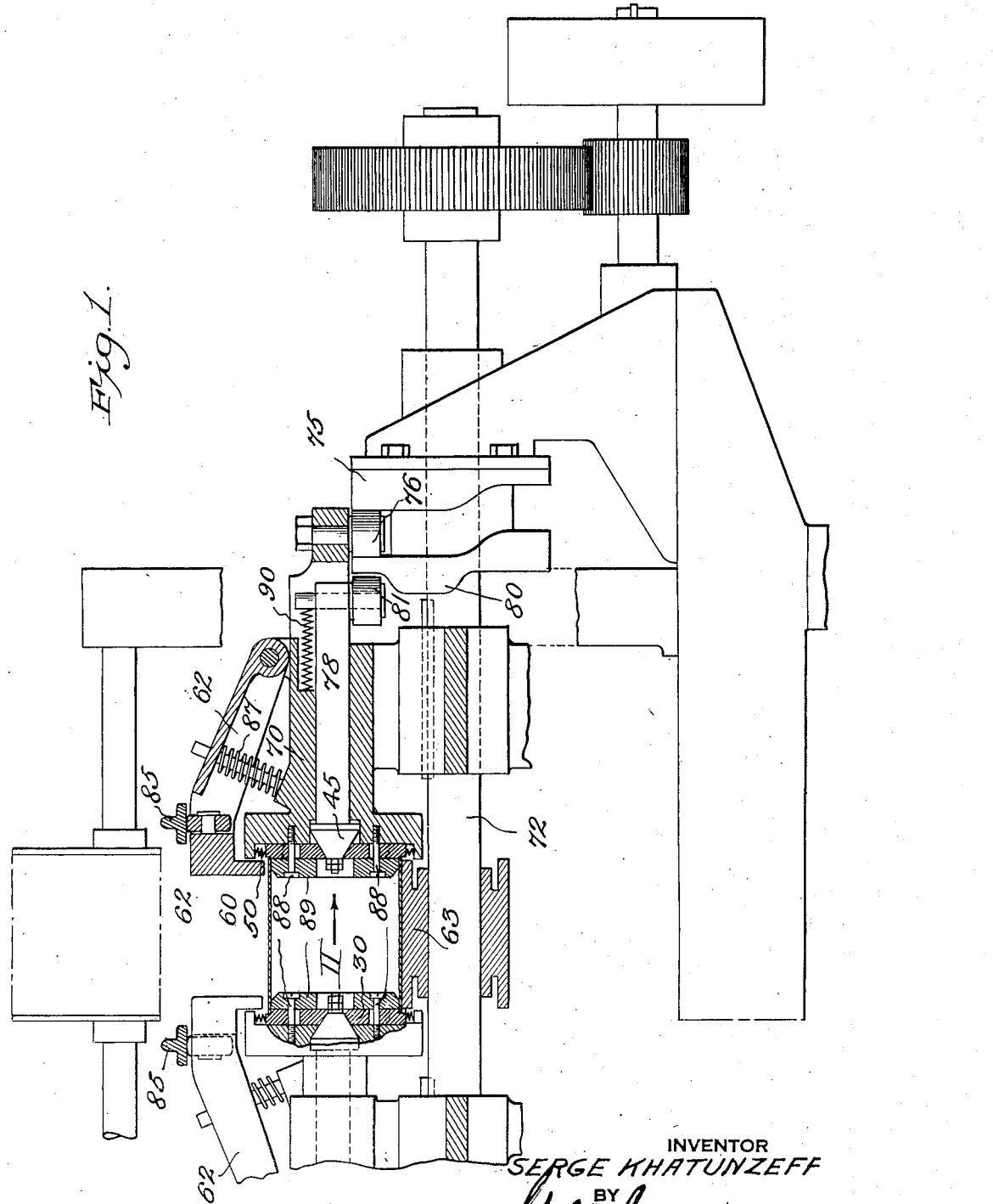

2,161,963

UNITED STATES PATENT OFFICE 2,161,963

APPARATUS FOR SHAPING TUBES, SHELLS, OR THE LIKE

Serge Khatunzeff, New York, N. Y., assignor to E. W. Bliss Company, Brooklyn, N. Y., a corporation of Delaware Application July 23, 1938, Serial No. 220,854

3 Claims. (Cl. 153—25)

This invention relates to apparatus for shaping tubes, shells, or the like, and provides improvements therein.

Examples of shaping operations on tubes and shells are the formation of flanges on tubular bodies which are used to form cans, the formation of beads, threads and knurls, and the shaping of a body, a neck, or other portion to a precise or definite shape, and also the trimming of the edges of tubes or shells. Apparatus for this purpose usually comprises a part composed of segments, constructed and arranged to be inserted into the tube or shell, and which are spread or expanded to effect shaping of the tube or shell. The tube or shell is usually supported during the shaping operation. As the segments are spread or expanded, they separate leaving gaps between them, and at these gaps the shaping is imperfect or incomplete, the tube or shell having an irregularity, as a dent or projection, in the parts thereof which are opposite the gaps between the segments.

The present invention provides an apparatus for shaping tubes, shells, or the like, comprising segments which are spread or expanded to perform the shaping operation, and which eliminates irregularities in the portion of the tube or shell which is acted on by the segments, due heretofore to the spreading of the segments.

The invention further provides an apparatus of the kind described which is of a very simple construction, and which operates at the accustomed speed of operation of prior apparatus for shaping tubes, shells or the like, and which operates reliably and effectively.

The invention will be explained in detail with reference to an apparatus for forming flanges on bodies for cans, and in the accompanying drawings and description it is shown and described as incorporated in an automatic flanging machine such as shown and described in the patent to Peter Kruse, 1,403,120, granted January 10, 1922.

Referring to said drawings:

Fig. 1 is a view partly in elevation and partly in vertical section, of an automatic flanging machine, such as shown and described in the aforesaid Kruse Patent 1,403,120, and embodying the present invention.

Fig. 2 is a face view of the parts immediately concerned with the invention, being a view looking in the direction of the arrow II, with the guide plate removed.

Figs. 3 and 4 are views of segmental parts illustrated in Fig. 2, Fig. 3 illustrating the segmental parts in their initial or collapsed position and Fig. 4 showing the parts in the spread or expanded position.

Figs. 5 and 6 illustrate other forms of the segmental parts, Fig. 6 further illustrating a form adapted for shaping or forming a bead on a tube or shell.

Referring to said drawings, numeral 10 designates a group of segments, the group having a contour or shape conforming generally to the shape of the tube or shell on which the shaping is to be done. The number of segments may vary. Three segments 15, 16 and 17 are shown in Fig. 5; and four segments 20, 21, 22 and 23 are shown in Figs. 2, 3 and 4; also in Fig. 6. A greater number may be used.

The contour faces 25, are constructed according to the shaping to be done. For flanging, the contour faces may be plain with the working edge blunted so as not to cut; for trimming, the contour faces 25 may also be plain, with the working edge sharpened so as to cut. For precise shaping of the tube or shell or a part thereof, the contour faces may also be plain. For beading, a rib or bead 27 may be formed on the contour face 25. For threading, appropriate ribs similar to 27 may be formed on the contour face.

Numerals 30 designate angle pieces. These angle pieces extend across the meeting plane 32 of the segments, are constructed and arranged so as to be spread or expanded as the segments are spread or expanded, and occupy a position substantially flush with the contour faces 25 of the segments in the spread or expanded position of the segments, the segments and angle pieces 30 thereby presenting a full perimeter or contour face in said expanded or spread position. The movement of the angle pieces is preferably effected directly through the segments and any suitable arrangement to this end may be provided. Preferably, and as shown, the segments are provided with slots or grooves 35, formed at an angle to the meeting plane 32 of adjacent segments, the angularity between two slots converging toward a common meeting plane 32 conforming to the angularity between the two legs 37, 38 of an angle piece. The legs 37, 38 of an angle piece fit within the slots 35, and, as the segments 25 spread, the co-action between the slots 35 and the legs 37, 38 is such as to force the angle piece 30 outward, so that the angle pieces spread or expand with the expansion or spreading of the segments. Conversely, when the segments are collapsed or moved inward, the angle pieces 30 are moved inward. The nose or outer corner 40 of the angle piece 30 is preferably made flat so that in a chosen or predetermined spread or expanded position of the segments the aforesaid flat face or nose fills the gap between the spread segments and forms a continuation of, or is flush with, the contour faces 25 of the segments. This position is illustrated in Fig. 4.

Suitable means for spreading or expanding the segments may be provided. The expanding means may be, as here shown, a wedge 45 having faces thereon for moving or spreading the segments radially.

Suitable means are preferably provided for retracting the segments when the wedge 45 is retracted. In the embodiment shown, springs 50 are provided and suitably arranged to perform this function.

Usually the tube or shell is held exteriorly during the shaping. For this purpose a die or holder 60 may be provided. The die or holder 60, as here shown, may comprise two parts 62, 63, constructed and arranged to be moved toward and from one another so as to hold and release the tubular body or shell at or adjacent the portion being shaped.

When constructed as part of an automatic flanging machine (or of a machine for performing any of the other shaping operations hereinbefore referred to), the segment-group 10 may be mounted on a head 70, revolvable with a shaft 72. The head 70 also has axial movement so as to carry the segment-group into and out of the tubular body or shell. The axial movement may be provided by a cam 75 operating upon a roller or projection 76 on the head 70. In this type of machine, the wedge 45 may be carried by a slide 78 mounted in the head 70, which slide is moved axially to spread the segments by means of a cam 80 contacting with a roller or projection 81 on the slide 78.

One of the holder parts, as the part 62 may be pivotally mounted on the head 70. It is moved inward, through the action of a cam track 85, to support or grip the tubular body or shell. Means may be provided, as a spring 87, which acts to move the support-part 62 outwardly when said part is free from the action of the cam 85, and thereby release the tubular body or shell. The other part 63 of the support or holder 60 may be carried by the shaft 72 as shown.

The group 10 of segments is held against the end thrust of the wedge 45 by suitable means. This means may be a plurality of bolts 88 fastened to the head 70, and passing through a guide plate 89 in front of the group 10 of segments and through slots 90 in the segments.

Operation

As embodied in automatic machines such as shown, the operation is as follows:

Tubular can bodies drop from the chute onto the part 63 of the support. At this time the cams 75 and 80 have withdrawn the axially movable heads 70 to one side. As the shaft 72 rotates carrying the can body resting in the support 63, the cam 75 moves the axially movable heads 70 inward so that the group of segments 10 are positioned within the tubular body. The cam track 85 also acts on the pivoted holder 62 causing it to grip or hold the can body exteriorly. Following this the cam 80 goes into action, moving the slide 78 carrying the wedge 45 inward to spread or expand the segments.

The action of the group 10 of spreading segments is to bend over the marginal portion of the tubular can body to form a flange at substantially right angles to the body. As the group 10 of segments spreads, the angle pieces, by reason of the inclined planes between the legs 37 and 38 and the sides of the slots 35 in the segments, also spread, and, as they move outwardly, they move across the perimeter of the group 10 of the segments which circumscribe the segments in the collapsed position thereof, and across the bent-over, or bending, marginal portion of the tubular can body which constitutes the flange, thereby bending the marginal portion of the tubular can body at the gaps between the spread or expanding segments, and thereby forming a level or regular or flush flange. As shown the nose or flat face 40 of the angle piece moves to a position where it is flush with the contour faces 25 of the segments in the spread position. In this application of the invention, the flanging of a tubular body, it is not so important that the nose 40 be formed with a flat face, or that it be flush with the contour faces 25 of the segments. The movement of the angle pieces 30 for flanging can be greater or less than that illustrated, so long as they move across the flange and flatten it at the gap between the spread or expanded segments of the group 10. In beading and in certain other shaping operations, the nose 40 would be formed so as to be flush with the contour faces 25 of the segments in the group 10, in the spread or expanded position of said segments.

As the shaft 72 continues its rotation, carrying with it the heads 70 and the holding parts 62, 63, the holding part 62 is released by the cam track 85, the spring 87 swings said part 62 away from the tubular can body, and the roller 81 moves off of the cam 80, allowing the spring 90 to retract the slide 78, thereby allowing the springs 50 to collapse or retract the segments in group 10. As the segments are collapsed or retracted, the angle pieces 30 are retracted or moved inward with the segments. The cam 75 acts on the roller 76 to draw the head 70, and with it the group of segments 10, to one side and out of the tubular can body. The can body, when the holder part 63 turns to a lower position, drops from the holder and away from the machine, a chute (not shown) being ordinarily used for leading the flanged can bodies away.

The invention may receive other embodiments than that herein illustrated and described.

What is claimed is:

1. Apparatus for shaping tubes, shells or the like, comprising radially movable segments, angle-pieces extending across the meeting planes of the segments, said segments having grooves at an angle to a meeting plane, the legs of said angle-pieces fitting slidably in said grooves, said legs and grooves being so constructed and arranged that the angle pieces are moved outwardly by the segments when spreading, and means for simultaneously spreading said segments and angle-pieces, said spreading means comprising said grooves and said legs, the arrangement being such that the movement of said segments imparts a resultant spreading movement to said angle-pieces.

2. Apparatus for shaping tubes, shells or the like, according to claim 1, wherein said angle-pieces and segments are so constructed and arranged as to move the outermost part of an angle-piece across which the perimeter which circumscribes the segments in the collapsed position thereof.

3. Apparatus for shaping tubes, shells or the like, according to claim 1, wherein said angle-pieces and segments are so constructed and arranged as to move the outermost part of an angle-piece to a position flush with the perimeter of the segments in the spread position thereof.

SERGE KHATUNZEFF.